United States Patent Office 3,729,420
Patented Apr. 24, 1973

3,729,420
ANTIFREEZE COMPOSITIONS
Herbert L. Sanders, Skokie, Ill., and John B. Braunwarth, Janesville, Wis., assignors to Northern Petrochemical Company, Omaha, Nebr.
No Drawing. Original application Oct. 31, 1968, Ser. No. 764,919, now abandoned. Divided and this application Aug. 10, 1970, Ser. No. 62,668
Int. Cl. C09k 3/02
U.S. Cl. 252—77                4 Claims

ABSTRACT OF THE DISCLOSURE

Disclosed are olefin oxide adducts of N-alkyl diethanolamines and processes of producing the same. The adducts are useful foam inhibitors and as such find use in ethylene glycol-based engine coolants.

---

This is a divisional application of our co-pending application Ser. No. 764,919, filed Oct. 31, 1968, and now abandoned.

This invention relates to chemical compounds. More particularly, this invention is concerned with novel defoaming and foam preventing agents useful in liquid coolants such as for internal combustion engines.

Aqueous ethylene glycol is widely used as an antifreeze cooling liquid in engines, particularly gasoline and diesel internal combustion engines. Corrosion inhibitors present in the ethylene glycol, as well as radiator contaminants, lead to foaming of the ethylene glycol antifreeze coolant. Foaming causes displacement of coolant from the radiator through the overflow pipe. This loss is undesirable because it can lead to overheating of the engine and because of the cost of adding make-up antifreeze solution. There is thus a clear need for materials which are effective in preventing formation of foam in antifreeze engine coolants and which destroy foam which may form.

According to the present invention there are provided novel defoaming and foam preventing agents for use in ethylene glycol based aqueous coolants for engines. These agents are olefin oxide adducts of N-alkyl diethanolamine having the formula

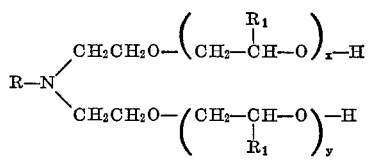

wherein R is lower alkyl such as an alkyl having 1 to 7 carbons, and advisably 1 or 2 carbons, $R_1$ is a lower alkyl and especially such groups having 1 or 2 carbons, and $x$ and $y$ are numbers from about 1 to 100, and advisably 20 to 50.

The defoaming agents provided herewith can be produced by reacting an N-alkyl diethanolamine with an olefin oxide in the absence of oxygen and in the presence of a strong basic catalyst such as sodium hydroxide or potassium hydroxide. This process can be represented as follows:

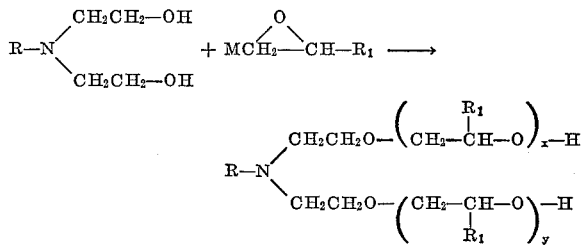

wherein R is a lower alkyl such as methyl, ethyl or propyl, $R_1$ is a lower alkyl and particularly a methyl or ethyl group and $x$ and $y$ represent numbers from 1 to 100, and advisably 20 to 50 and $x+y$ equals M which equals the moles of olefin oxide reacted with one mole of N-alkyl diethanalamine.

Among the olefin oxides which can be used in the precess are propylene oxide and 1,2-epoxybutane.

The N-alkyl diethanolamines are disclosed in the art and N-methyl diethanolamine is commercially available from Union-Carbide.

Catalysts used in alkoxylating reactions are well known in the art and do not form the essence of this invention. From about 2 to 200 moles of olefin oxide, and especially propylene oxide, are advisably reacted per mole of N-alkyl diethanolamine. An elevated temperature sufficiently high to form the adducts in a reasonable time is employed. Usually a reaction temperature in the range of about 80 to 200° C. is suitable to produce the desired product. The reaction proceeds at atmospheric pressure although superatmospheric pressures such as up to about 100 p.s.i. can also be used. The reaction is generally completed in about 1 to 8 hours depending to some extent on the amount of olefin oxide used, the temperature of reaction and the reaction pressure. The reaction is effected in the absence of oxygen. Oxygen can be removed by evacuating the vessel in which the reaction is effected or by flushing the same with an inert gas such as nitrogen. Following termination of the reaction the product is advisably heated under reduced pressure to drive off any unreacted material. The products of this invention vary, at room temperature, from liquids to solids.

The products provided herewith are excellent defoaming agents for ethylene glycol antifreeze solutions. They can be added directly to ethylene glycol, 100% basis, in small but effective amounts or to aqueous solutions of ethylene glycol. The defoamers of this invention are effective in foam prevention when added in amounts from about 0.001 to 0.1% by weight of the ethylene glycol, on a 100% basis, or based on the ethylene glycol content of an aqueous solution thereof. Usually however it is advisable to use at least 0.005% by weight of the ethylene glycol content whether the ethylene glycol is diluted or not.

The defoamers provided herewith which appear to be especially useful are the propoxylated derivative of N-methyl diethanolamine of the formula

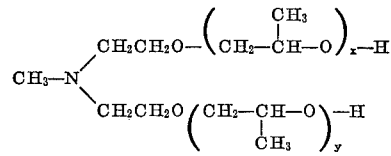

wherein $x$ and $y$ are numbers from about 20 to 50 and $x+y$ equals about 40 to 100 or about the number of moles of propylene oxide reacted with each mole of N-methyl diethanolamine. Most useful defoamers are believed to be those having $x+y$ equal to about 75 to 100.

The following examples are presented to illustrate the preparation of specific defoamers within the scope of the invention.

EXAMPLE 1

N-methyl diethanolamine—48 mole propylene oxide adduct

To a stainless steel Parr reactor is charged 50 g. (0.42 mole) of N-methyl diethanolamine and 3.1 g. of sodium hydroxide catalyst. The reactor is sealed and the system stripped at about 250 mm. and 93 to 143° C. At 148 to 232° C. and 45 to 50 p.s.i., propylene oxide is added until the reaction product has a neutralization equivalent of 2890. This gives a product with about 48 moles of propylene oxide. The product is removed from the reactor and is ready for use as a defoamer.

EXAMPLE 2

N-methyl diethanolamine—86 mole propylene oxide adduct

The 86 mole propylene oxide adduct is made by charging about 400 g. of the 48 mole propylene oxide adduct from Example 1 to the auotclave with 2 g. of flake sodium hydroxide. The propylene oxide (38 moles) is added at 175° C. and 50 p.s.i. to a point where the reaction product has a neutralization equivalent of 5000, representing approximately 86 moles of propylene oxide in the adduct.

EXAMPLE 3

N-methyl diethanolamine—24 mole propylene oxide adduct

One mole of N-methyl diethanolamine is reacted with 24 moles of propylene oxide according to the procedure of Example 1 to make this adduct.

EXAMPLE 4

N-methyl diethanolamine—120 mole propylene oxide adduct

One mole of N-methyl diethanolamine is reacted with 120 moles of propylene oxide according to the procedure of Example 1 to make this adduct.

The defoaming activity of the N-methyl diethanolamine-propylene oxide adducts of the examples above were determined in two tests.

In one test, a 100 ml. sample composed of 1 part of ethylene glycol containing 0.005% by weight of a defoamer to be tested and 2 parts of disilled water was placed in a 50 x 400 mm. test tube and heated at 70° C. Nitrogen gas was passed at 1 liter per minute through a medium porosity 20 mm. diameter gas dispersion tube submerged in the test tube containing the test fluid. Foam heights were recorded after 5 minutes of nitrogen blowing, and foam break time was determined by measuring the time for the foam to break after nitrogen flow was shut off. Table 1 shows the results of defoaming tests with the propoxylated N-methyl-diethanolamine defoamers of Examples 1 to 4, all of which are shown to reduce foam, compared with a conventional propylene oxide-ethylene oxide block polymer type defoamer (Pluronic L 61—molecular weight 1700). The 86 mole propylene oxide adduct of N-methyl diethanolamine was superior to the propylene oxide-ethylene oxide block polymer type defoamer.

TABLE 1

| Antifoam agent at 0.005% by weight of ethylene glycol | Foam height, mm. | Break time, sec. |
|---|---|---|
| Control | 250 | 30 |
| 86 mole propylene oxide adduct of N-methyl diethanolamine (Example 2) | 10 | 2 |
| 48 Mole propylene oxide adduct of N-methyl diethanolamine (Example 1) | 150 | 15 |
| Propylene oxide-ethylene oxide block polymer | 20 | 2 |
| 24 mole propylene oxide adduct of N-methyl diethanolamine (Example 3) | 200 | 20 |
| 120 mole propylene oxide adduct of N-methyl diethanolamine (Example 4) | 190 | 22 |

The 86 mole adduct is shown to be superior to the propylene oxide-ethylene oxide block polymer (Pluronic L 61).

In a second test, a 100 ml. sample composed of 2 parts of ethylene glycol containing 0.1% by weight of defoamer to be tested and 3 parts of distilled water was placed in a 50 x 400 mm. test tube and heated to 80° C. Nitrogen gas was passed at 200 ml. per minute through a medium porosity 20 mm. diameter gas dispersion tube. Foam heights were recorded after 5 minutes of nitrogen blowing, and break time was the time required for the foam to break after nitrogen flow was stopped.

An anionic foam test was run by adding to the antifreeze solution 2 ml. of a 1% solution of a commercial alkylaryl sulfonate. The sulfonate was used to simulate cooling system chemicals such as soluble oil rust inhibitor, water pump lubricants, and residual amounts of detergent cleaners. Table 2 shows the test result.

TABLE 2

| Antiform agent at 0.1% by weight of ethylene glycol | Foam height, mm. | Break time, sec. | Anionic foam height, mm. |
|---|---|---|---|
| None | 3 | 20 | 360 |
| 86 mole propylene oxide adduct of N-methyl diethanolamine (Example 2) | 2 | 2 | 15 |
| 48 mole propylene oxide adduct of N-methyl diethanolamine (Example 1) | 7 | 5 | 20 |
| Propylene oxide-ethylene oxide black polymer | 5 | 2 | 18 |
| Silicone agent: | | | |
| A | 2 | 120 | 100 |
| B | 2 | 300 | 120 |

The data of Table 2 shows the defoamers of this invention are superior to silicone defoamers, and that the 86 mole adduct of Example 2 is superior to the propylene oxide-ethylene oxide block polymer.

The foregoing detailed description has been given for clearness of understanding only, and no necessary limitations should be understood theerfrom, as modifications will be obvious to those skilled in the art.

What is claimed is:

1. An antifreeze composition consisting essentially of ethylene glycol and from about 0.001 to 0.1% by weight of the ethylene glycol of a defoaming agent of the formula

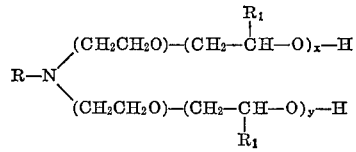

wherein R is an alkyl group having from 1 to 7 carbon atoms and $R_1$ is an alkyl group having from 1 to 2 carbon atoms per molecule and $x$ and $y$ represent numbers from 1 to 100.

2. A composition according to claim 1 in which R is an alkyl group having a maximum of two carbon atoms and $x$ and $y$ represent numbers from about 20 to 50.

3. A composition according to claim 1 in which R and $R_1$ represent methyl groups and $x$ and $y$ represent numbers from about 20 to 50 $x+y$ equals about 40 to 100.

4. A composition according to claim 3 in which $x+y$ equals about 75 to 100.

References Cited

UNITED STATES PATENTS

| 3,238,136 | 3/1966 | Willard et al. | 252—75 |
| 3,344,075 | 9/1967 | Scott | 252—75 |
| 3,088,913 | 5/1963 | Milnes et al. | 252—358 X |
| 2,748,085 | 5/1956 | Monson | 252—321 |
| 2,701,239 | 2/1955 | Ryznar | 252—321 |
| 3,235,501 | 2/1966 | Waldmann | 252—321 X |
| 3,118,000 | 1/1964 | Dupre et al. | 260—584 |
| 3,141,905 | 7/1964 | Longley | 260—584 B X |
| 3,463,737 | 8/1969 | Kasperl | 252—358 X |
| 3,574,755 | 4/1971 | McConnell et al. | 260—584 B |

LEON D. ROSDOL, Primary Examiner

H. A. PITLICK, Assistant Examiner

U.S. Cl. X.R.

252—321, 357; 260—584 B